United States Patent
Matthews et al.

(10) Patent No.: US 10,351,223 B2
(45) Date of Patent: Jul. 16, 2019

(54) BALLOON ALTITUDE CONTROL SYSTEM

(71) Applicants: Taylor Evan Matthews, San Diego, CA (US); Anthony Paul Fry, San Diego, CA (US); Jessica Marie Lavigne, San Diego, CA (US); Rafy Uddin Athar, San Diego, CA (US)

(72) Inventors: Taylor Evan Matthews, San Diego, CA (US); Anthony Paul Fry, San Diego, CA (US); Jessica Marie Lavigne, San Diego, CA (US); Rafy Uddin Athar, San Diego, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 324 days.

(21) Appl. No.: 15/265,663

(22) Filed: Sep. 14, 2016

(65) Prior Publication Data

US 2018/0072396 A1    Mar. 15, 2018

(51) Int. Cl.
*B64B 1/40* (2006.01)
*B64B 1/62* (2006.01)
*B64B 1/44* (2006.01)

(52) U.S. Cl.
CPC ............... *B64B 1/62* (2013.01); *B64B 1/40* (2013.01); *B64B 1/44* (2013.01)

(58) Field of Classification Search
CPC .... B64B 1/40; B64B 1/44; B64B 1/58; B64B 1/62; A63H 27/10
See application file for complete search history.

(56) References Cited

U.S. PATENT DOCUMENTS

| | | | | |
|---|---|---|---|---|
| 4,174,082 A * | 11/1979 | Eshoo | ................... | B64B 1/58 244/31 |
| 4,262,864 A * | 4/1981 | Eshoo | ................... | B64B 1/58 126/577 |
| 6,119,979 A * | 9/2000 | Lee | ................... | B64B 1/44 244/97 |
| 7,973,236 B2 * | 7/2011 | Sinsabaugh | ............. | B64B 1/14 136/245 |
| 8,733,697 B2 * | 5/2014 | DeVaul | ................... | B64B 1/62 244/126 |
| 8,804,228 B1 * | 8/2014 | Biffle | ................... | B64B 1/62 359/296 |

(Continued)

FOREIGN PATENT DOCUMENTS

CA        2801768 A1 *   7/2014   ............ C12M 21/02

*Primary Examiner* — Richard R. Green
(74) *Attorney, Agent, or Firm* — Tarolli, Sundheim, Covell & Tummino LLP

(57) ABSTRACT

One example includes an altitude control system arranged in a balloon. The system includes a transparent outer chamber configured to receive incident infrared radiation. The system also includes an inner chamber comprising suspended particles configured to change the optical transmission of the inner chamber between a first state having a first transmissivity and a second state having a second transmissivity. The first transmissivity is greater than the second transmissivity. The system further includes a state controller configured to electrically activate the suspended particles to change the optical transmission of the inner chamber from the first state to the second state to change an altitude of the balloon based on the incident infrared radiation.

20 Claims, 4 Drawing Sheets

(56) References Cited

U.S. PATENT DOCUMENTS

| | | | |
|---|---|---|---|
| 9,033,274 B2* | 5/2015 | DeVaul | B64B 1/62 244/31 |
| 2012/0244779 A1* | 9/2012 | Cernohous | B32B 27/18 244/30 |

* cited by examiner

BALLOON ALTITUDE CONTROL SYSTEM

TECHNICAL FIELD

This disclosure relates generally to aircraft control systems, and more specifically to a balloon altitude control system.

BACKGROUND

Aviation has been used for a large variety of purposes over the course of modern history, including warfare, reconnaissance, weather, and communications. The earliest aviation vehicle was the balloon, which is still widely used today for a variety of purposes. One example of modern balloon use is weather prediction and communications (e.g., as a stratospheric payload platform). Balloons are filled with a highly buoyant gas (e.g., helium) that allows the balloon to ascend to a maximum altitude before inevitably descending based on a variety of factors, including weight of the payload and temperature of the gas. As a result, a balloon may have a limited mission life that can depend on descent of the balloon from a respective mission altitude.

SUMMARY

One example includes an altitude control system arranged in a balloon. The system includes a transparent outer chamber configured to receive incident infrared radiation. The system also includes an inner chamber comprising suspended particles configured to change the optical transmission of the inner chamber between a first state having a first transmissivity and a second state having a second transmissivity. The first transmissivity is greater than the second transmissivity. The system further includes a state controller configured to electrically activate the suspended particles to change the optical transmission of the inner chamber from the first state to the second state to change an altitude of the balloon based on the incident infrared radiation.

Another example includes a method for changing an altitude of a balloon. The method includes providing an altitude activation signal to a state controller associated with an altitude control system. The method also includes electrically activating suspended particles in a smart-glass structure associated with the altitude control system that is substantially enclosed by the balloon via the state controller in response to the altitude activation signal to change the optical transmission of the smart-glass structure from a first state having a first transmissivity to a second state having a second transmissivity that is greater than the first transmissivity to change the altitude of the balloon based on incident infrared radiation.

Another example includes a stratospheric payload platform system. The system includes a balloon that includes a transparent material to substantially pass incident radiation. The system also includes a communications payload configured to at least one of transmit and receive communications signals. The system further includes an altitude control system. The altitude control system includes a transparent outer chamber configured to receive incident infrared radiation and an inner chamber comprising suspended particles configured to change the optical transmission of the inner chamber between a first state having a first transmissivity and a second state having a second transmissivity, the first transmissivity being greater than the second transmissivity. The altitude control system further includes a state controller configured to electrically activate the suspended particles to change the optical transmission of the inner chamber from the first state to the second state to change an altitude of the balloon based on the incident infrared radiation.

DETAILED DESCRIPTION

This disclosure relates generally to aircraft control systems, and more specifically to a balloon altitude control system. The balloon can correspond to a communications balloon that carries a payload (e.g., a communications payload), such as for use as a stratospheric payload platform. The balloon can be formed from a substantially transparent material (e.g., polyethylene), and can include an altitude control system. The altitude control system can include a transparent outer chamber that is configured to receive incident infrared radiation (e.g., passing through the substantially transparent material of the balloon). The altitude control system also includes an inner chamber comprising suspended particles (e.g., configured as a smart-glass) configured to change the optical transmission of the inner chamber between a first state having a first transmissivity and a second state having a second transmissivity. As an example, the first transmissivity can be greater than the second transmissivity, such as based on the first state being substantially transparent and the second state being substantially translucent or substantially opaque.

The altitude control system can further include a state controller that is configured to electrically activate the suspended particles to change the optical transmission of the inner chamber from the first state to the second state to change an altitude of the balloon based on the incident infrared radiation. As an example, the state controller can change the state of the inner chamber based on receiving a signal (e.g., via the communications payload of the balloon). For example, the inner chamber is configured to pass the incident infrared radiation in the first state based on the substantially transparent transmissivity, and is configured to absorb the incident infrared radiation in the second state based on the second transmissivity. Thus, the incident infrared radiation can heat the gas within the balloon to increase the altitude of the balloon. For example, the altitude control system can provide convection of the gas to provide heating of the cooler portions of the volume of the gas within the balloon to maintain heating, and thus an increase in the altitude.

Figure 1:
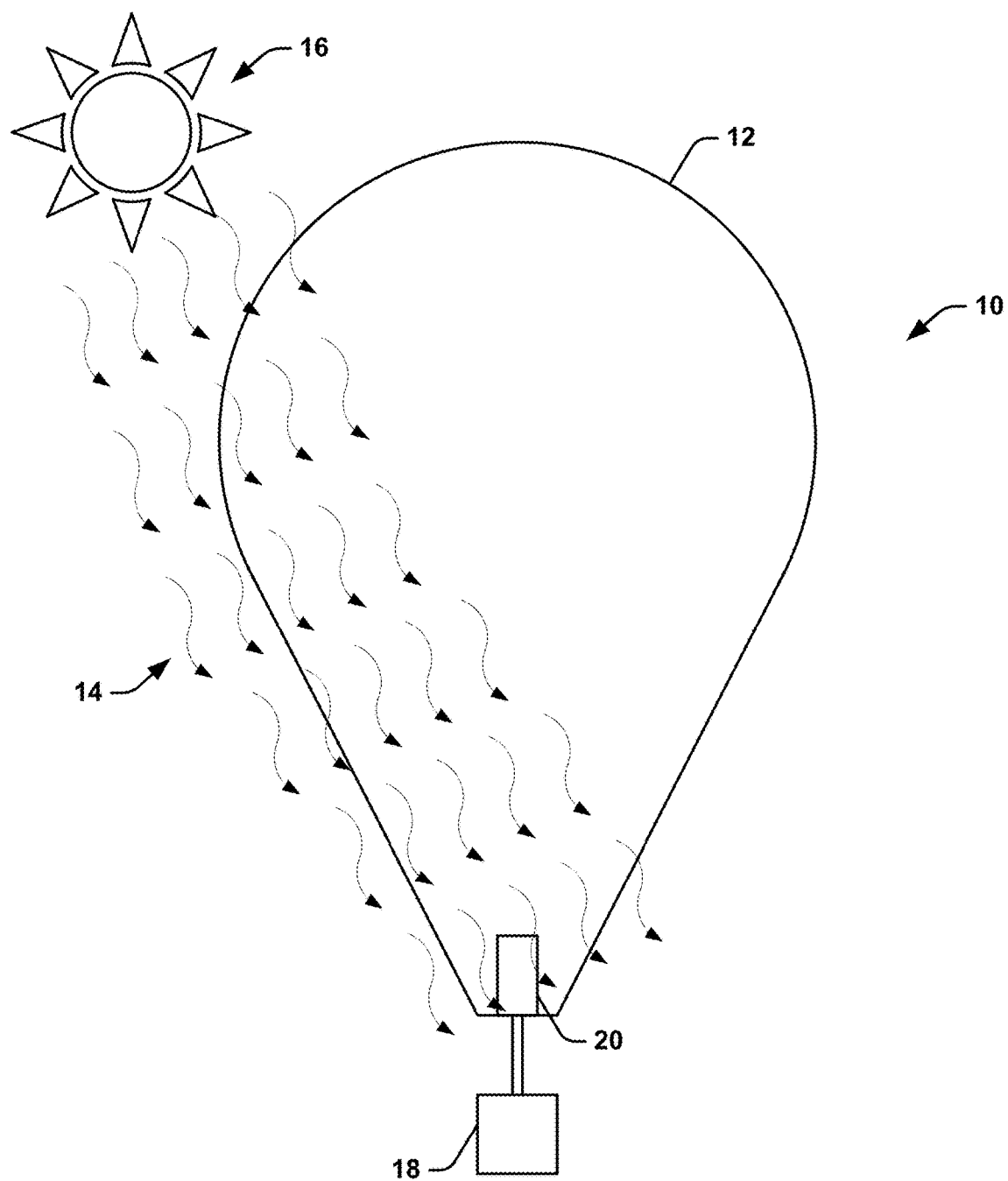
FIG. 1 illustrates an example of a balloon system.

FIG. 1 illustrates an example of a balloon system 10. As an example, the balloon system 10 can correspond to a communications balloon, such as for use as a stratospheric payload platform. The balloon system 10 includes a balloon envelope portion 12 that is configured to hold a gas that is more buoyant than air (e.g., helium). As an example, the balloon envelope portion 12 can be formed from a very thin and lightweight plastic material, such as polyethylene.

Therefore, the gas within the balloon envelope portion 12 can provide lift of the balloon into the atmosphere or higher (e.g., stratosphere), such as to altitudes of between approximately 60,000 to approximately 100,000 feet. Furthermore, as described herein, the balloon envelope portion 12 can be substantially transparent to incident infrared radiation, demonstrated in the example of FIG. 1 as solar radiation 14 emanating from the Sun 16. The balloon system 10 also includes a payload 18. As an example, the payload 18 can be configured as a wireless communications node that is configured to at least one of transmit and receive wireless signals. Thus, the balloon system 10 can be configured as a stratospheric payload platform in an extended communications system, or as part of a reconnaissance mission.

The balloon system 10 further includes an altitude control system 20 that is enclosed within the balloon envelope portion 12. The altitude control system 20 is configured to control the altitude of the balloon system 10 based on the incident infrared radiation 14, as described in greater detail herein. For example, in a first state, the balloon system 10 can dwell, such that the balloon system 10 can very slowly decrease in altitude based on a slow cooling of the gas within the balloon envelope portion 12. In response to the altitude of the balloon system 10 decreasing below a predetermined altitude, for example, the altitude control system 20 can activate to increase the altitude of the balloon system 10 based on the solar radiation 14 that is provided through the balloon envelope portion 12, and thus through a portion of the altitude control system 20. As another example, the operation of the altitude control system 20 can be reversed. Thus, in the first state, the balloon system 10 can dwell, such that the balloon system 10 can initially increase and/or very slowly decrease in altitude based on a slow cooling of the gas within the balloon envelope portion 12. The altitude control system 20 can thus activate to decrease the altitude of the balloon system 10 based on the solar radiation 14 that is provided through the balloon envelope portion 12, and thus through a portion of the altitude control system 20.

The altitude control system 20 can be subsequently deactivated, such as upon the balloon system 10 achieving a sufficient predetermined altitude, to allow the balloon system 10 to return to a dwell state. Because the altitude control system 20 harnesses the solar radiation 14 of the Sun 16, the altitude control system 20 can consume very little power in providing lift of the balloon system 10 to change the altitude. Accordingly, the mission life of the balloon system 10 can be significantly extended based on activation and deactivation of the altitude control system 10 to control the altitude of the balloon system 10 based on the solar radiation 14.

Figure 2:
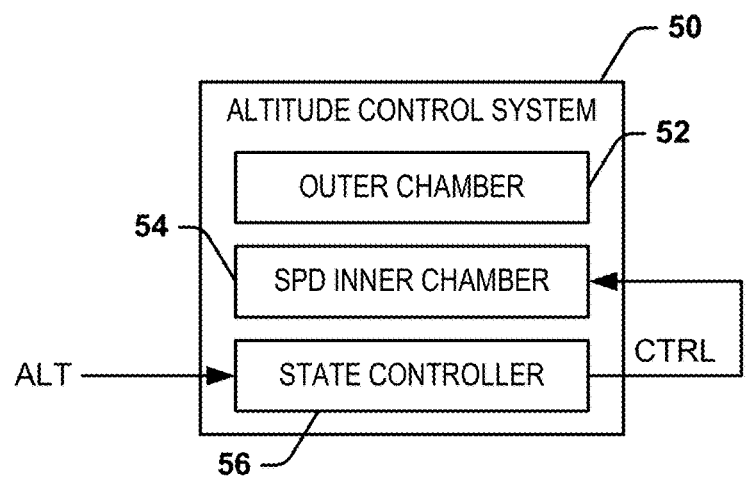
FIG. 2 illustrates an example of an altitude control system.

FIG. 2 illustrates an example of an altitude control system 50. The altitude control system 10 can be implemented to provide altitude control for a balloon, such as the balloon system 10 in the example of FIG. 1. Therefore, reference is to be made to the example of FIG. 1 in the following description of the example of FIG. 2. As an example, the altitude control system 50 can be configured to provide altitude control of the balloon system 10 based on incident infrared radiation, such as the solar radiation 14 received from the Sun 16. As an example, the altitude control system 50 can be enclosed within the balloon envelope portion 12.

The altitude control system 50 includes a transparent outer chamber 52 that is configured to receive the incident infrared radiation (e.g., passing through the substantially transparent material of the balloon envelope portion 12). The altitude control system 50 also includes a suspended particle device (SPD) inner chamber 54 comprising suspended particles (e.g., configured as a smart-glass). The SPD inner chamber 54 is configured to change the optical transmission of the SPD inner chamber 54 between a first state having a first transmissivity and a second state having a second transmissivity. As an example, the first transmissivity can be greater than the second transmissivity, such as based on the first state being substantially transparent and the second state being substantially translucent or substantially opaque. As a result, the incident infrared radiation can be substantially passed in the first state, which can correspond to a dwell state during which time the balloon system 10 very slowly decreases in altitude based on a slow cooling of the gas (e.g., helium) within the balloon envelope portion 12. However, in the second state, the incident infrared radiation can be substantially absorbed, which can result in a heating of the gas within the balloon envelope portion 12 and thus an increase in the altitude of the balloon system 10. As an example, the outer chamber 52 and the SPD inner chamber 54 can have a specific arrangement with respect to each other to facilitate convection of the heated gas to provide lift of the balloon system 10.

As another example, the first transmissivity can be less than the second transmissivity, such as based on the first state being substantially reflective and the second state being substantially transparent. As a result, the incident infrared radiation can be substantially reflected in the first state, which can correspond to a dwell state during which time the balloon system 10 very slowly increases in altitude based on a slow heating of the gas (e.g., helium) within the balloon envelope portion 12. However, in the second state, the incident infrared radiation can be substantially passed, which can result in a slow cooling of the gas within the balloon envelope portion 12 and thus a decrease in the altitude of the balloon system 10.

The altitude control system 50 also includes a state controller 56 that is configured to control the state of the SPD inner chamber 54 between the first state and the second state. The state controller 56 can be configured to provide a control signal CTRL that can correspond to a very low amplitude current (e.g., 1.8 mA/ft$^2$) that can activate the suspended particles within the SPD inner chamber 54. As a result, in response to the control signal CTRL, the SPD inner chamber 54 can decrease in optical transmissivity, such that the incident infrared radiation is substantially absorbed by the SPD inner chamber 54, as opposed to the incident infrared radiation being passed through the SPD inner chamber 54 in the first state of a much higher optical transmissivity. The absorption of the incident infrared radiation results in a heating of the gas in the balloon envelope portion 12, and thus lift of the balloon system 10. Accordingly, activation and deactivation of the control signal CTRL can result in transition of the SPD inner chamber 54 from the first state to the second state and from the second state to the first state, respectively, to control the altitude of the balloon system 10.

In the example of FIG. 2, the state controller 56 receives a signal ALT that corresponds to activation of the state controller 56 to assert the control signal CTRL. As a first example, the signal ALT can be provided from the communications payload 18, such as based on the communications payload 18 receiving a wireless signal from an external command station (e.g., from a satellite, ground station, or other aircraft). Thus, in response to the wireless signal received at the communications payload 18, the communications payload 18 can provide the signal ALT to the state controller 56 to assert the control signal CTRL to switch the SPD inner chamber 54 from the first state to the second state to increase the altitude of the balloon system 10. The communications payload 18 can thus subsequently receive another wireless signal to prompt the communications payload 18 to command the state controller 56 to de-assert the control signal CTRL to switch the SPD inner chamber 54 from the second state to the first state to return the balloon system 10 to a dwell state.

As a second example, the signal ALT can be provided from an altitude sensor (not shown) that can be configured to monitor an altitude associated with the balloon system 10. In response to the altitude of the balloon system 10 decreasing below a predetermined threshold, the altitude sensor can provide the signal ALT to the state controller 56 to assert the control signal CTRL to switch the SPD inner chamber 54 from the first state to the second state to increase the altitude of the balloon system 10. Similarly, in response to the altitude of the balloon system 10 increasing above a predetermined threshold, the altitude sensor can provide the signal ALT to the state controller 56 to de-assert the control signal CTRL to switch the SPD inner chamber 54 from the second state to the first state to return the balloon system 10 to a dwell state.

Figure 3:
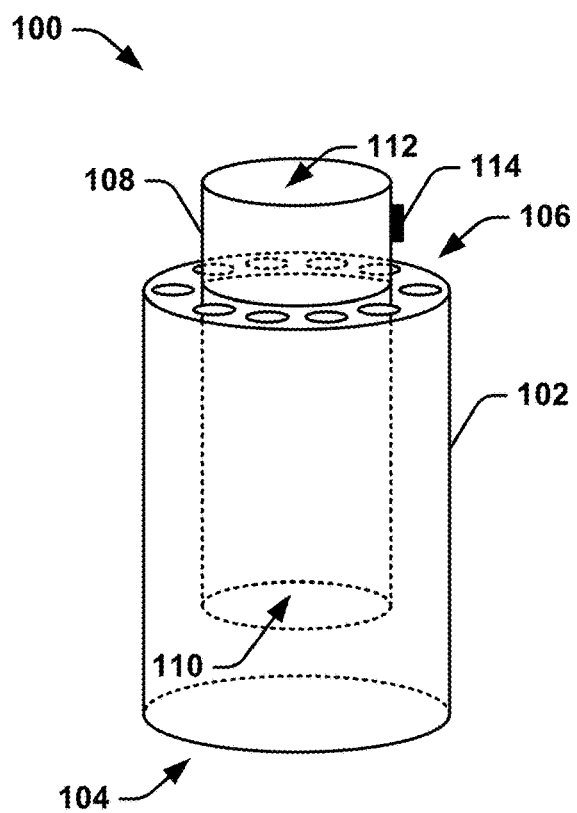
FIG. 3 illustrates an example plan-view of an altitude control system.

FIG. 3 illustrates an example plan-view of an altitude control system 100. The altitude control system 100 can correspond to the altitude control system 50 in the example of FIG. 2. As a result, reference is to be made to the example of FIGS. 1 and 2 in the following description of the example of FIG. 3.

The altitude control system 100 includes a transparent outer chamber 102 that is configured to receive the incident infrared radiation (e.g., passing through the substantially transparent material of the balloon envelope portion 12). In the example of FIG. 3, the transparent outer chamber 102 is arranged as a hollow structure, demonstrated in the example of FIG. 3 as a cylinder, that includes an enclosed first end 104 and a second end 106. The altitude control system 100 also includes an SPD inner chamber 108 comprising suspended particles (e.g., configured as a smart-glass). In the example of FIG. 3, the SPD inner chamber 108 is likewise arranged as a hollow structure, demonstrated in the example of FIG. 3 as a cylinder, that includes a first end 110 and a second end 112 that include a respective first opening and a second opening, such that the SPD inner chamber 108 is arranged as an open tube. Thus, in the example of FIG. 3, the transparent outer chamber 102 is arranged as substantially surrounding the SPD inner chamber 108, with the second end 112 of the SPD inner chamber 108 extending from the second end 106 of the transparent outer chamber 102, and with the transparent outer chamber 102 enclosing the opening at the first end 110 of the SPD inner chamber 108.

The second end 106 of the transparent outer chamber 102 includes a flange that circumscribes an outer surface of the SPD inner chamber 108 to define a substantially enclosed volume between the SPD inner chamber 108 and the outer chamber 102. The flange includes at least one opening (e.g., hole(s)), demonstrated in the example of FIG. 3 as a sequence of holes around the flange at the second end 106 of the transparent outer chamber 102, to allow transfer of the gas in the balloon envelope portion 12 between the transparent outer chamber 102 and the inner volume of the balloon envelope portion 12. In addition, the opening at the first end 110 of the SPD inner chamber 108 allows transfer of the gas in the balloon envelope portion 12 between the transparent outer chamber 102 and the SPD inner chamber 108, and the opening at the second end 112 of the SPD inner chamber 108 allows transfer of the gas in the balloon envelope portion 12 between the SPD inner chamber 108 and the inner volume of the balloon envelope portion 12. Therefore, the physical arrangement of the altitude control system 100 allows for convection of the gas in response to an increase in temperature of the gas, as resulting from activation of the suspended particles in the SPD inner chamber 108, as described in greater detail herein.

As described previously, the altitude control system 100 can be arranged within the volume of the balloon envelope portion 12. For example, the first end 104 of the transparent outer chamber 102 can be coupled to a flange that circumscribes the transparent outer chamber 102, such that the material of the balloon envelope portion 12 can couple to the flange to seal the gas as confined within the balloon envelope portion 12. In the example of FIG. 3, the altitude control system 100 also includes a state controller 114 that is configured to control the state of the SPD inner chamber 108 between the first state and the second state, as described herein. The state controller 114 can be configured to provide a control signal CTRL that can correspond to a very low amplitude current (e.g., 1.8 mA/ft$^2$) that can activate the suspended particles within the SPD inner chamber 108.

Figure 4:
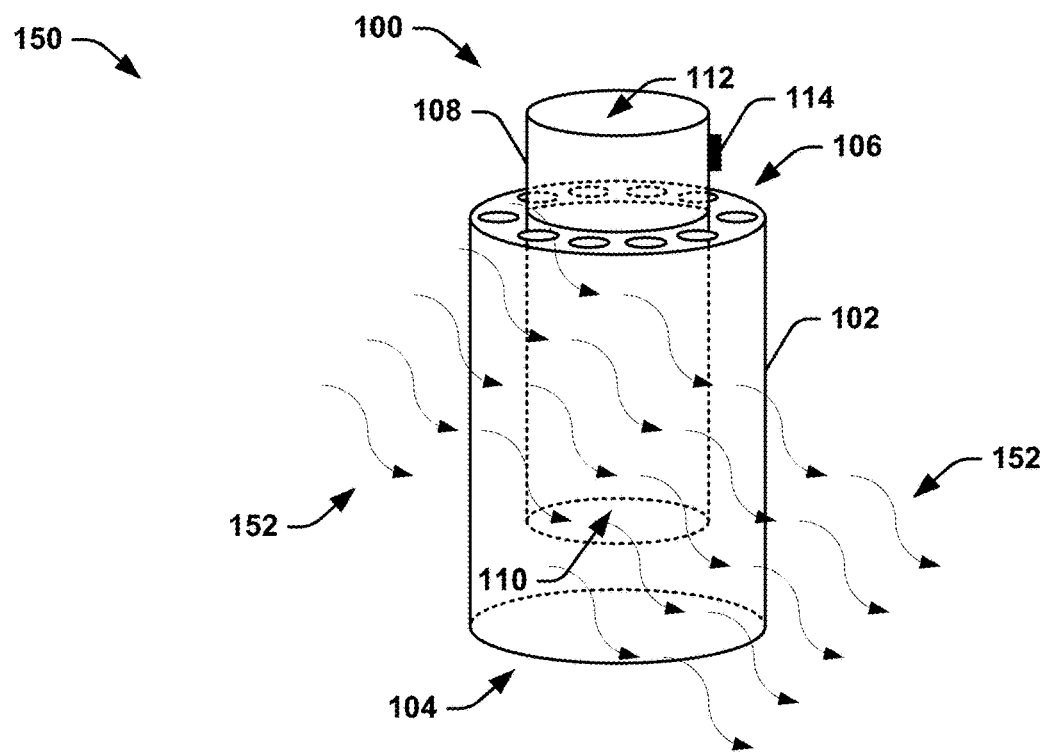
FIG. 4 illustrates an example of a diagram of the first state of the altitude control system.

FIG. 4 illustrates an example of a diagram 150 of the first state of the altitude control system 100 of the example of FIG. 3. In the diagram 150, the SPD inner chamber 108 is demonstrated in the first state, and thus has a first optical transmissivity that is approximately transparent to incident infrared radiation, demonstrated in the example of FIG. 4 at 152, which can correspond to solar radiation from the Sun. As an example, the state controller 114 can be deactivated, and not providing the current corresponding to the control signal CTRL, such that the SPD inner chamber 108 can operate in the first state. As a result, the incident infrared radiation 152 can substantially entirely pass through the altitude control system 100. Accordingly, the incident infrared radiation 152 does not heat the gas, resulting in a cooling of the gas. The cooling of the gas results in contraction of the volume of the gas within the balloon envelope portion 12 to decrease buoyancy of the balloon envelope portion 12 relative to atmosphere. As a result, the decreased buoyancy of the balloon envelope portion 12 relative to atmosphere provides a slow decrease in altitude, such as in a dwell state while completing mission objectives.

Figure 5:
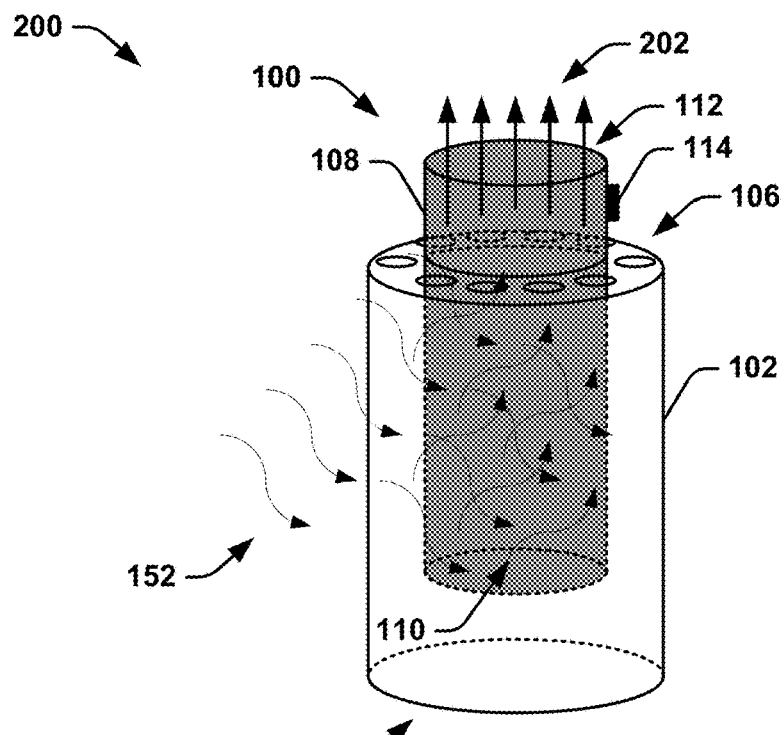
FIG. 5 illustrates an example of a diagram of the second state of the altitude control system.

FIG. 5 illustrates an example of a diagram 200 of the second state of the altitude control system 100 of the example of FIG. 3. In the diagram 200, the SPD inner chamber 108 is demonstrated in the second state, and thus has a second optical transmissivity that is translucent or approximately opaque to the incident infrared radiation 152. As an example, the state controller 114 can be activated (e.g., via the signal ALT), and thus providing the current (e.g., 1.8 mA/ft$^2$) corresponding to the asserted control signal CTRL, such that the SPD inner chamber 108 can operate in the second state. As a result, the incident infrared radiation 152 can be absorbed at the surface of the SPD inner chamber 108 (e.g., with a power of approximately 1360 W/m$^2$), thus heating the gas within the SPD inner chamber 108.

The heated gas, demonstrated in the example of FIG. 5 at 202, can thus be vented at the opening of the second end 112 of the SPD inner chamber 108, and thus rises within the volume of the balloon envelope portion 12 of the balloon system 10. As the heated gas is vented from the altitude control system 100 and rises within the balloon envelope portion 12, cooler gas nearer the bottom of the balloon envelope portion 12 diffuses into the transparent outer chamber 102 via the opening(s) in the flange at the second end 106 of the transparent outer chamber 102. The cooler gas can then diffuse into the SPD inner chamber 108 through the opening at the first end 110 of the SPD inner chamber 108 as the heated gas is vented from the opening at the second end 112 of the SPD chamber 108. Therefore, in response to the SPD inner chamber 108 being activated to the second state, the altitude control system 100 can provide convection of the gas in the balloon envelope portion 12 to circulate the gas in the balloon envelope portion 12. In response to the convection of the gas in the balloon envelope portion 12, and thus the increase in the temperature of the gas, the volume of the gas expands to increase buoyancy of the balloon envelope portion 12 relative to atmosphere. As a result, the increased buoyancy of the balloon envelope portion 12 relative to atmosphere provides lift to increase the altitude of the balloon system 10. As another example, the altitude control system 100 can include a fan position, for example, at the opening of the second end 112 of the SPD inner chamber 108 to increase the convection of the heated gas.

It is to be understood that the altitude control system 100 is not intended to be limited to the examples of FIGS. 3-5, but could be arranged in any of a variety of different geometrical designs (e.g., spherical, prismatic, and/or including more than two chambers). Therefore, the altitude control system 100 can be configured in a variety of ways.

Figure 6:
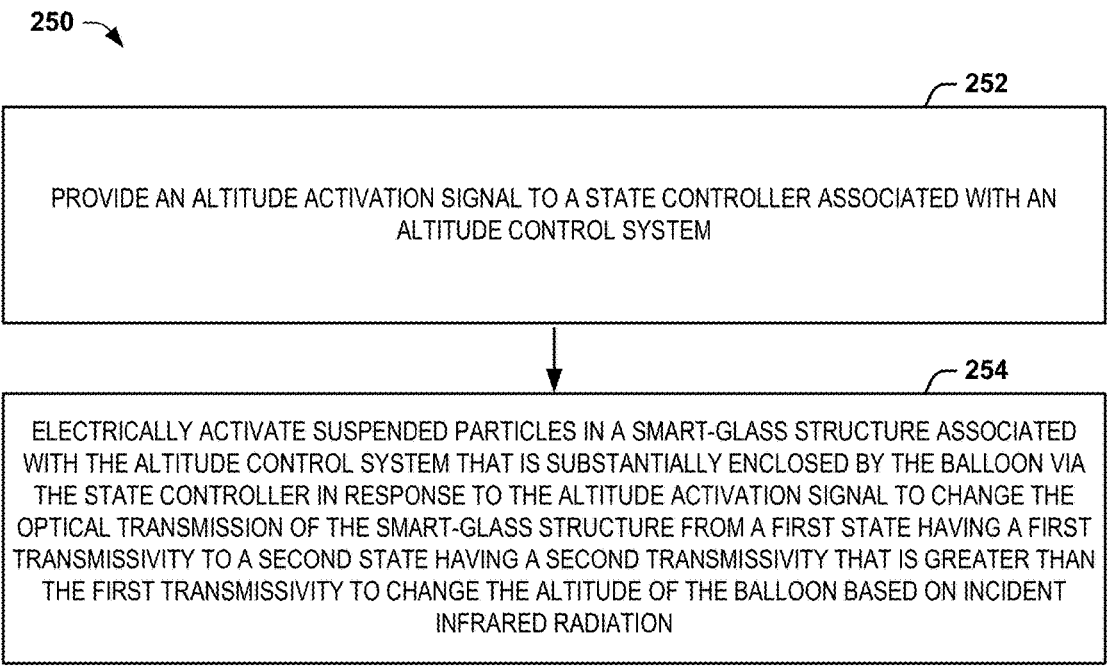
FIG. 6 illustrates an example of a method for changing altitude of a balloon.

In view of the foregoing structural and functional features described above, a method in accordance with various aspects of the present disclosure will be better appreciated with reference to FIG. 6. While, for purposes of simplicity of explanation, the method of FIG. 6 is shown and described as executing serially, it is to be understood and appreciated that the present disclosure is not limited by the illustrated order, as some aspects could, in accordance with the present disclosure, occur in different orders and/or concurrently with other aspects from that shown and described herein. Moreover, not all illustrated features may be required to implement a method in accordance with an aspect of the present disclosure.

FIG. 6 illustrates a method 250 for changing an altitude of a balloon (e.g., the balloon system 10). At 252, an altitude activation signal (e.g., the activation signal ALT) is provided to a state controller (e.g., the state controller 56) associated with an altitude control system (e.g., the altitude control system 20). At 254, suspended particles in a smart-glass structure (e.g., the SPD inner chamber 54) associated with the altitude control system that is substantially enclosed by the balloon are electrically activated via the state controller in response to the altitude activation signal to change the optical transmission of the smart-glass structure from a first state (e.g., in the example of FIG. 4) having a first transmissivity to a second state (e.g., in the example of FIG. 5) having a second transmissivity that is greater than the first transmissivity to increase the altitude of the balloon based on incident infrared radiation.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. An altitude control system arranged in a balloon, the system comprising:
   a transparent outer chamber configured to receive incident infrared radiation;
   an inner chamber comprising suspended particles configured to change the optical transmission of the inner chamber between a first state having a first transmissivity and a second state having a second transmissivity, the first transmissivity being greater than the second transmissivity, wherein the inner chamber is arranged as a hollow structure comprising a first opening and a second opening to allow convection of a gas associated with the balloon between the inner chamber and the transparent outer chamber; and
   a state controller configured to electrically activate the suspended particles to change the optical transmission of the inner chamber from the first state to the second state to change an altitude of the balloon based on the incident infrared radiation.

2. The system of claim 1, wherein the inner chamber is configured to pass the incident infrared radiation in the first state and is configured to absorb the incident infrared radiation in the second state to heat a gas associated with the balloon to change the altitude of the balloon.

3. The system of claim 1, wherein the state controller is configured to receive an altitude control signal configured to control transition of the optical transmission of the inner chamber between the first state and the second state.

4. The system of claim 1, wherein the state controller comprises a sensor configured to control transition of the optical transmission of the inner chamber between the first state and the second state in response to the altitude of the balloon decreasing below a predetermined threshold.

5. The system of claim 1, wherein the inner chamber is arranged as a first hollow structure, and wherein the outer chamber is arranged as a second hollow structure comprising an enclosed first end and a second end.

6. The system of claim 5, wherein the transparent outer chamber is arranged as substantially surrounding the inner chamber and enclosing the first opening of the inner chamber, and wherein the second end of the transparent outer chamber comprises a flange that circumscribes an outer surface of the inner chamber to define a substantially enclosed volume between the inner chamber and the outer chamber.

7. The system of claim 6, wherein the flange comprises at least one opening to allow transfer of a gas between the outer chamber and the inner volume of the balloon.

8. The system of claim 5, wherein the inner chamber coaxially extends from the second end of the transparent outer chamber to expose the second opening of the inner chamber to an inner volume of the balloon.

9. The system of claim 8, further comprising a fan arranged at the second opening of the inner chamber that is configured to circulate a gas associated with the balloon.

10. A stratospheric payload platform comprising the altitude control system of claim 1, wherein the balloon substantially encloses the altitude control system and comprises a transparent material that is optically transmissive to the infrared radiation, wherein the stratospheric payload platform further comprises a communications payload.

11. A method for changing an altitude of a balloon, the method comprising:
   providing an altitude activation signal to a state controller associated with an altitude control system; and
   electrically activating suspended particles in a smart-glass structure associated with the altitude control system that is substantially enclosed by the balloon via the state controller in response to the altitude activation signal to change the optical transmission of the smart-glass structure from a first state having a first transmissivity to a second state having a second transmissivity that is greater than the first transmissivity, the smart-glass structure corresponding to an inner chamber of the altitude control system, the altitude control system further comprising a transparent outer chamber configured to receive the incident infrared radiation, the inner chamber being arranged as a hollow structure comprising a first opening and a second opening to allow convection of a gas associated with the balloon between the inner chamber and the transparent outer chamber to change the altitude of the balloon based on incident infrared radiation at the second state.

12. The method of claim 11, wherein the inner chamber is arranged as a first hollow structure and wherein the outer chamber is arranged as a second hollow structure comprising an enclosed first end and a second end.

13. The method of claim 11, wherein electrically activating the suspended particles comprises electrically activating the suspended particles in the smart-glass structure to change the optical transmission of the smart-glass structure from the first state having a first transmissivity that allows the incident infrared radiation to substantially entirely pass through the smart-glass structure to the second state having a second transmissivity that allows the incident infrared radiation to be substantially entirely absorbed by the smart-glass structure.

14. The method of claim 11, wherein providing the altitude activation signal comprises transmitting a wireless altitude activation signal to a wireless receiver associated with a communications payload of the balloon.

15. The method of claim 14, further comprising:
transmitting a wireless altitude deactivation signal to the wireless receiver; and
electrically deactivating the suspended particles in response to the wireless altitude deactivation signal to change the optical transmission of the smart-glass structure from the second state to the first state to facilitate dwell of the altitude of the balloon.

16. A stratospheric payload platform system comprising:
a balloon comprises a transparent material to substantially pass incident radiation;
a communications payload configured to at least one of transmit and receive communications signals; and
an altitude control system comprising:
a transparent outer chamber configured to receive incident infrared radiation;
an inner chamber comprising suspended particles configured to change the optical transmission of the inner chamber between a first state having a first transmissivity and a second state having a second transmissivity, the first transmissivity being greater than the second transmissivity, wherein the inner chamber arranged as a hollow structure comprising a first opening and a second opening to allow convection of a gas associated with the balloon between the inner chamber and the transparent outer chamber; and
a state controller configured to electrically activate the suspended particles to change the optical transmission of the inner chamber from the first state to the second state to change an altitude of the balloon based on the incident infrared radiation.

17. The system of claim 16, wherein the inner chamber is configured to pass the incident infrared radiation in the first state and is configured to absorb the incident infrared radiation in the second state to heat a gas associated with the balloon to change the altitude of the balloon.

18. The system of claim 16, wherein the communications payload is configured to receive an altitude control signal configured to control transition of the optical transmission of the inner chamber between the first state and the second state.

19. The system of claim 16, wherein the inner chamber is arranged as a first hollow structure, and wherein the outer chamber is arranged as a second hollow structure comprising an enclosed first end and a second end.

20. The system of claim 19, wherein the transparent outer chamber is arranged as substantially surrounding the inner chamber and enclosing the first opening of the inner chamber, and wherein the second end of the transparent outer chamber comprises a flange that circumscribes an outer surface of the inner chamber to define a substantially enclosed volume between the inner chamber and the outer chamber and which comprises at least one opening to allow transfer of a gas between the outer chamber and the inner volume of the balloon.

\* \* \* \* \*